United States Patent
Thieringer

(10) Patent No.: US 9,446,482 B2
(45) Date of Patent: Sep. 20, 2016

(54) LASER SYSTEM PROCESSING UNIT CONNECTION

(71) Applicant: TRUMPF LASER GmbH + Co. KG, Schramberg (DE)

(72) Inventor: Rainer Thieringer, Boesingen (DE)

(73) Assignee: TRUMPF LASER GMBH, Schramberg (DE)

( * ) Notice: Subject to any disclaimer, the term of this patent is extended or adjusted under 35 U.S.C. 154(b) by 352 days.

(21) Appl. No.: 14/266,960

(22) Filed: May 1, 2014

(65) Prior Publication Data

US 2014/0312019 A1 Oct. 23, 2014

Related U.S. Application Data

(63) Continuation of application No. PCT/EP2012/064267, filed on Jul. 20, 2012.

(30) Foreign Application Priority Data

Nov. 2, 2011 (DE) .......................... 10 2011 085 593

(51) Int. Cl.
*B23K 26/70* (2014.01)
*B23K 37/00* (2006.01)
(Continued)

(52) U.S. Cl.
CPC ......... *B23K 26/422* (2013.01); *B23K 26/0604* (2013.01); *B23K 26/702* (2015.10); *B23K 26/706* (2015.10); *B23K 37/006* (2013.01); *B23K 26/70* (2015.10)

(58) Field of Classification Search
CPC ... B23K 26/702; B23K 26/70; B23K 37/006

USPC .................................................... 219/121.83
See application file for complete search history.

(56) References Cited

U.S. PATENT DOCUMENTS 6,259,056 B1 * 7/2001 Cowden ............. G05B 19/4183
219/121.69
6,766,117 B2 7/2004 Notheis
(Continued)

FOREIGN PATENT DOCUMENTS

CN 201594884 U 9/2010
CN 101873176 A 10/2010
(Continued)

OTHER PUBLICATIONS

Notification of Transmittal of Translation of the International Preliminary Report on Patentability for corresponding PCT Application No. PCT/EP2012/064267, mailed May 15, 2014, 7 pages.
(Continued)

*Primary Examiner* — Samuel M Heinrich
(74) *Attorney, Agent, or Firm* — Fish & Richardson P.C.

(57) ABSTRACT

A laser system includes one or more lasers and one or more laser processing units each connected to a respective one of the one or more lasers by a laser light cable and a data line associated uniquely with the laser light cable. Each laser processing unit includes a safety device for monitoring the laser processing unit and an interface for the data line. The laser system also includes a central safety control operably associated with the one or more laser processing units and configured to monitor the safety devices of multiple laser processing units of the laser system. The interface of each of the one or more laser processing units is connected to the central safety control and via the data line to the respective one of the one or more lasers.

20 Claims, 3 Drawing Sheets

(51) Int. Cl.
*B23K 26/30* (2014.01)
*B23K 26/06* (2014.01)

(56) References Cited

U.S. PATENT DOCUMENTS

2008/0051913 A1 2/2008 Dold et al.
2011/0210107 A1* 9/2011 Hammann ....... G05B 19/40937
219/121.72

FOREIGN PATENT DOCUMENTS

DE 3813789 A1 11/1989
DE 19718137 A1 11/1998
DE 10018422 A1 10/2001

OTHER PUBLICATIONS

International Search Report from corresponding PCT Application No. PCT/EP2012/064267, mailed Nov. 8, 2012, 4 pages.

* cited by examiner

LASER SYSTEM PROCESSING UNIT CONNECTION

CROSS REFERENCE TO RELATED APPLICATIONS

This application is a continuation of and claims priority under 35 U.S.C. §120 to PCT Application No. PCT/EP2012/064267 filed on Jul. 20, 2012, which claimed priority under 35 U.S.C. §119 to German Application No. DE 102011085593.9 filed on Nov. 2, 2011. The content of these priority applications are hereby incorporated by reference in their entirety.

TECHNICAL FIELD

The present invention relates to laser systems having data connection between lasers and laser processing units.

BACKGROUND

A laser system comprises a plurality of lasers and a plurality of laser processing units which are each connected to the respective laser by means of a laser light cable and a data line which is parallel therewith. Each laser processing unit has a safety circuit which verifies the state (open or closed) of an operating cabin of the laser processing unit and in the event of an open operating cabin transmits a stop signal to the laser control of the associated laser.

In laser systems having a plurality of lasers and laser processing units the electrical safety circuits are intended to be monitored by a central safety control such as, for example, a programmable logic safety control (safety PLC) to which all the lasers and laser processing units are connected by means of a bus (safety bus). In order to be connected to the safety bus, a corresponding bus interface is provided on each laser.

When the laser system is constructed, not only the laser light cables have to be connected to the lasers but also the bus interfaces of the lasers have to be connected to the safety bus, for example, by means of electrical or optical cables which involves a degree of complexity in terms of cabling and increases the risk of cabling errors; however, a radio connection is also conceivable which involves the risk of configuration errors.

The association of the individual electrical safety circuits or the associated laser processing units thereof with the respective lasers is intended to be stored in a safety matrix of the safety PLC, which matrix is non-changeable and consequently secure in accordance with standard provisions. Via the safety PLC, it is consequently uniquely determined which laser is intended to be switched off or blocked in the event of an open safety circuit of a laser processing unit. Owing to the fixedly predetermined safety matrix, in the case of a plurality of lasers, a laser light cable must neither be switched from one laser to another laser nor must it be switched from a laser processing unit of one laser to a laser processing unit of another laser since, in the case of an open safety circuit, this does not then lead to the laser which is actually connected being switched off.

SUMMARY

One aspect of the invention features a laser system having one or more lasers and one or more laser processing units each connected to a respective one of the one or more lasers by a laser light cable and a data line associated uniquely with the laser light cable. Each laser processing unit includes a safety device for monitoring the laser processing unit and an interface for the data line. The laser system also includes a central safety control operably associated with the one or more laser processing units and configured to monitor the safety devices of multiple laser processing units of the laser system. The interface of each of the one or more laser processing units is connected to the central safety control and via the data line to the respective one of the one or more lasers.

An object of the present invention is to reduce cabling complexity and risk of cabling errors in the laser system and to enable laser light cables to be switched freely from one laser to another laser and from one laser processing unit to another laser processing unit.

This object is achieved according to the invention in that a central safety control for monitoring the safety devices of all the laser processing units of the laser system is provided and in that the interfaces of all the laser processing units of the laser system are connected, on the one hand, to the central safety control and, on the other hand, via the connected data line to the respective laser.

According to the invention, the laser is connected via the data line which runs parallel to the laser light cable to the interface of the central safety control provided at the side of the laser processing unit and preferably also to an interface of the central system control, these two interfaces also being able to be constructed physically as one interface and the signals of the system and safety control then being logically separated from each other. Since the at least one interface for the field bus and safety circuit is moved according to the invention to the side of the light guide cable remote from the laser, that is to say, towards the processing optics of the laser processing unit, no space for interface modules has to be reserved in the laser itself. Since, when a laser light cable is switched into another laser or into another laser processing unit, the associated data line also moves to the other laser or to the other laser processing unit, light guide cables can be freely switched, even when a fixedly stored safety matrix is used. This is because, in the case of an open safety circuit of a laser processing unit, the central safety control, via the interface of this laser processing unit and via the data line running parallel to the laser light cable, always switches off the laser which is actually connected.

Owing to the unique association of the data line with the laser light cable, for example, in the form of a cable bundle or a single cable, it is ensured that the data line and associated laser light cable are always connected to the same laser and to the same laser processing unit. The unique association can also take place via a verification cycle, for example, by a pilot laser beam, that is to say, a non-dangerous, weak laser beam, being sent from the laser through the laser light cable and it being verified, for example, by means of a detector whether the pilot light arrives at the laser processing unit or the processing optics to which the data line is connected. Advantageously, on the laser processing unit, the interfaces(s) for the field bus and safety circuit is/are located directly adjacent to the connection for the laser light cable, that is to say, on a processing optics, for example, the laser cutting head, or in the vicinity thereof. It is particularly advantageous for the interface(s) for the field bus and safety circuit and the connection of the laser light cable to be fitted directly to the processing optics since it is also often provided by the laser manufacturer and consequently the invention can also be used when the processing optics is used, for example, in combination with the automation technology of another manufacturer, such as, for example, a robot, a flat bed laser machine or a punching laser combination machine, which does not provide the interfaces necessary for the invention.

Preferably, the field bus and safety circuit interfaces of a laser processing unit are provided together in an interface module.

The data line may be formed, for example, by a single electrical line or by two electrical lines for a separate transmission of system control data and safety control data or by means of another light guide which runs parallel to the light guide of the laser light cable or by the light guide of the laser light cable.

In addition to lasers having a plurality of laser outputs, the invention is also advantageous and economical for lasers having a single laser output since, in the event of a defect, such a laser can be replaced independently of the automation technology of the user.

The invention relates to a laser processing unit and a processing optics having a safety circuit interface which is constructed as described above and a laser having an interface for the laser light cable and the data line in order to enable free switching of the laser light cable/data line from one laser to another.

Other advantages of the invention will be appreciated from the claims, the description and the drawings. The features mentioned above and those set out below may also be used individually per se or together in any combination. The embodiments shown and described are not intended to be understood to be a conclusive listing but are instead of exemplary character for describing the invention.

DETAILED DESCRIPTION

Figure 1:
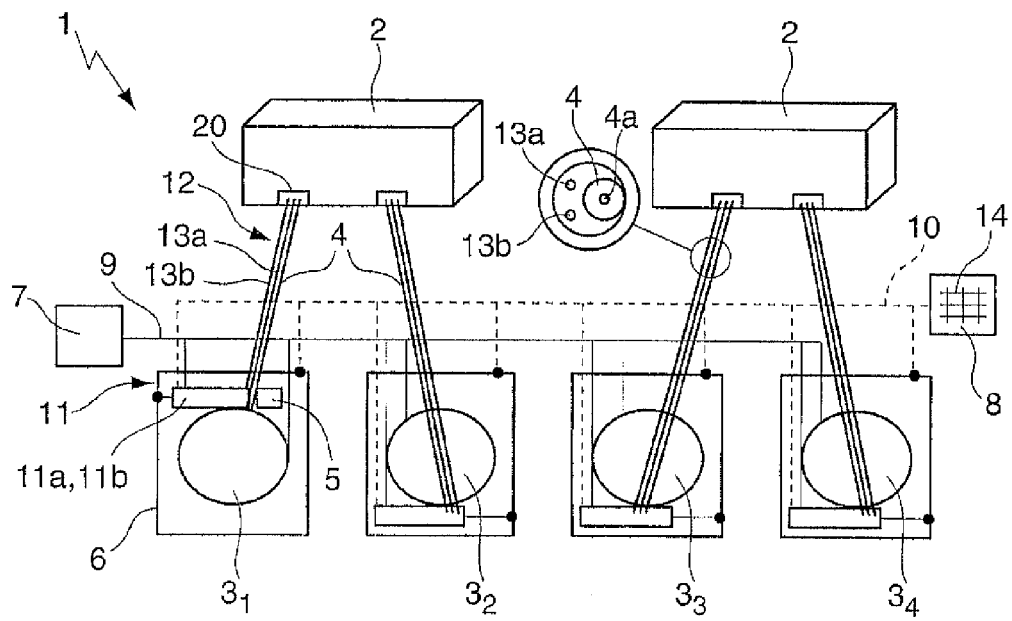
FIG. 1 shows a laser system having two lasers and four laser processing units, which are each connected to the lasers by means of a laser light cable and a data line which is parallel therewith.

The laser system 1 shown in FIG. 1 is a laser network having two lasers 2 and four laser processing units $3_1$-$3_4$ which are connected to one of the two lasers 2 via a laser light cable 4, respectively. The laser light cable 4 is connected at one end to an optical outlet or output of the laser 2 and at the other end to a processing optics 5 of the laser processing unit $3_1$-$3_4$, for example, to the laser cutting head of a robot, a flat bed laser machine, or a punching laser combination machine in order to guide the laser radiation produced in the laser 2 in the light guide 4a of the laser light cable 4 to the respective laser processing unit $3_1$-$3_4$. The processing optics 5 may, for example, be fitted to a robot arm (not shown) in order to orientate and move the laser radiation being discharged from the processing optics 5 with respect to a workpiece to be processed. Each laser processing unit $3_1$-$3_4$ has a safety device 6 in the form of an electrical safety circuit in order to monitor a laser protection cabin (not shown) of the respective laser processing unit $3_1$-$3_4$ for the correct closure state.

In order to control the lasers 2 and the laser processing units $3_1$-$3_4$, the laser system 1 has a central system control ("system PLC") 7 and for monitoring the safety devices 6 a central safety control ("safety PLC") 8. Alternatively, each laser processing unit $3_1$-$3_4$ may also be controlled by means of a local PLC or any combination of system PLC and local PLC. The laser processing units $3_1$-$3_4$ are each connected to the central system control 7 by means of a field bus 9 (for example, PROFInet) and the safety devices 6 thereof are connected to the central safety control 8 by means of an additional bus ("safety bus") 10.

Each laser processing unit $3_1$-$3_4$ and in particular the processing optics 5 thereof further comprises an interface module 11 having a field bus interface 11a which is connected, on the one hand, to the central system control 7 via the field bus 9 and, on the other hand, also to the respective laser 2 via a data line 12 running parallel to the laser light cable 4, and having a safety circuit interface 1 lb which is connected, on the one hand, to the central safety control 8 via the safety bus 10 and, on the other hand, also to the respective laser 2 via the data line 12 running parallel to the laser light cable 4. This data line 12 is formed by a first electrical line 13a for the transmission of system control data and a second electrical line 13b for a transmission of safety control data. The two electrical lines 13a, 13b and the laser light cable 4 are uniquely associated with each other, for example, by means of connecting all the cables at the ends thereof or by joining together the electrical lines 13a, 13b and the laser light cable 4 to form a single cable. The interfaces 11a, 11b or the interface module 11 are preferably fitted to the processing optics 5 or arranged in the vicinity thereof, as shown for the laser processing unit $3_1$; the interface modules 11 of the other laser processing unit $3_2$-$3_4$ are shown at another location only for reasons of clarity. The laser light cable 4 together with the associated data line 12 is connected to the laser 2 by means of an interface 20.

Figure 2:
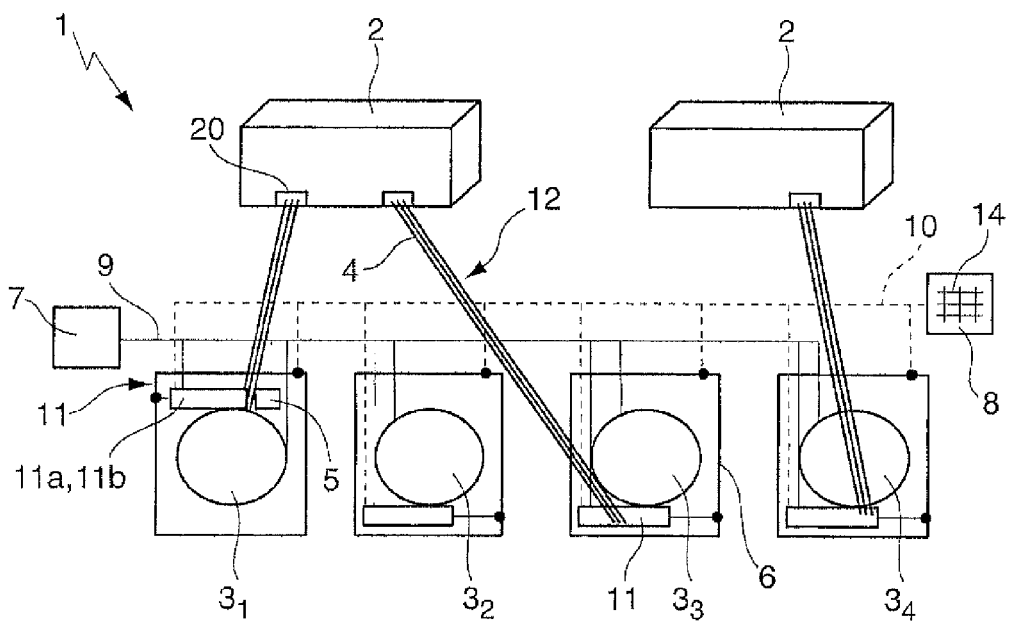
FIG. 2 shows the laser system shown in FIG. 1 after the switching of a laser light cable which is connected to a laser from one laser processing unit to another laser processing unit.

FIG. 2 shows the laser system 1 after a laser light cable 4 which is connected to a laser 2 is switched from the laser processing unit $3_2$ to the other laser processing unit $3_3$. The laser light cable 4 is now connected to the processing optics 5 of the other laser processing unit $3_3$ and the data line 12 is now connected to the interfaces 11a, 11b of the other laser processing unit $3_3$. Since, when the laser light cable 4 is moved, the associated data line 12 also moves to the other laser processing unit $3_3$, the light guide cable 4 can be freely switched, even when a safety matrix 14 which is fixedly stored in the central safety control 8 is used. This is because, in the event of an opening in the safety circuit 6 of the safety device of the laser processing unit $3_3$, the central safety control 8, via the interface 11a of the laser processing unit $3_3$ and via the data line 12 which runs parallel to the laser light cable 4, switches off the laser 2 which is connected to the laser processing unit $3_3$. Consequently, there is no longer an association in the safety matrix 14 of which laser is intended to be switched off in the event of an open safety circuit of the safety device 6 of a laser processing unit 3 or, for example, to be made safe by blocking the laser beam. Instead each laser processing unit 3 is associated in the safety matrix 14 with its corresponding interface 11a, whereby in the event of an open safety circuit 6 of a laser processing unit 3, the associated interface 11a is always referenced, whereby, via the data line 12 which is connected thereto and which runs parallel to the laser light cable 4, the laser 2 which is actually connected to the respective laser processing unit is always switched off or made safe.

Figure 3:
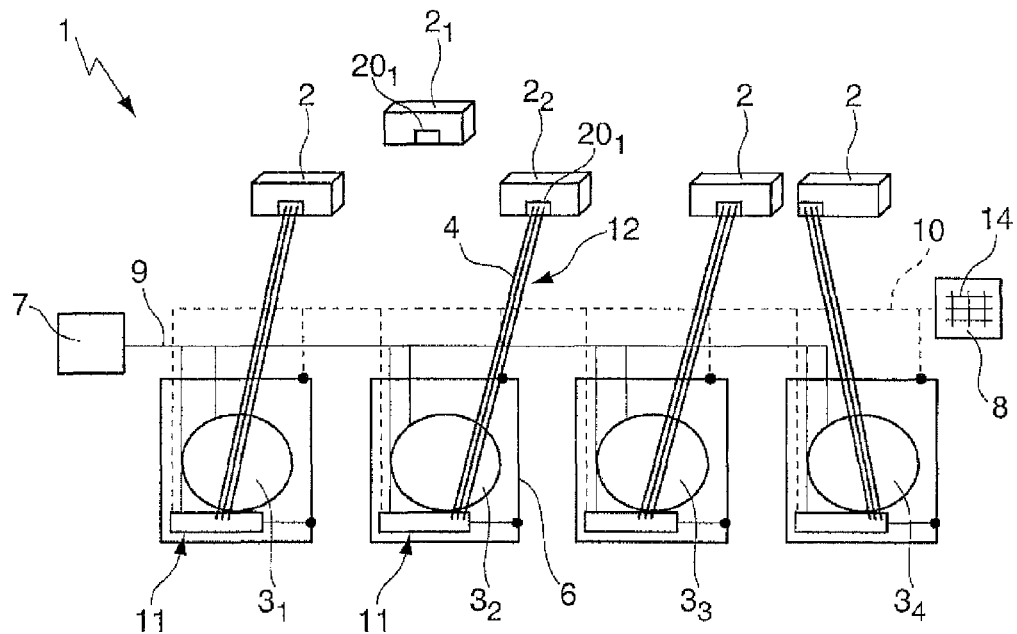
FIG. 3 shows the laser system shown in FIG. 1 after a laser light cable which is connected to a laser processing unit is switched from one laser to another laser.

FIG. 3 shows the laser system 1 after the laser light cable 4 which is connected to the laser processing unit $3_2$ has been switched from the interface $20_1$ of a laser $2_1$ to the interface $20_2$ of another laser $2_2$. Since, when the laser light cable 4 is switched, the associated data line 12 also moves to the other laser $2_2$, the laser light cable 4 can be freely switched, even when a safety matrix 14 is used. This is because, in the event of an opening in the safety circuit 6 of the laser processing unit $3_2$, the central safety control 8 via the interface 11a of the laser processing unit $3_2$ and via the data line 12 which runs parallel to the laser light cable 4 switches off the laser $2_2$ connected to the laser processing unit $3_2$ or blocks the laser beam thereof. Consequently, a direct association of the laser 2 with the safety device 6 of a laser processing unit 3 in the safety matrix 14 is no longer necessary.

Via the data line 12, when a corresponding safety protocol is used, it is also possible to transmit secure, discrete or similar values which can be used, for example, for the safe power limitation of each individual light path with respect to the nature of the respective laser processing unit. It is thus possible to verify, for example, whether the maximum laser power can be applied at the output of the laser to the processing optics 5 of the laser processing unit; if not, the laser radiation can be switched off in a safe manner—for example, by means of a closure switch controlled by the safety circuit.

Figure 4:
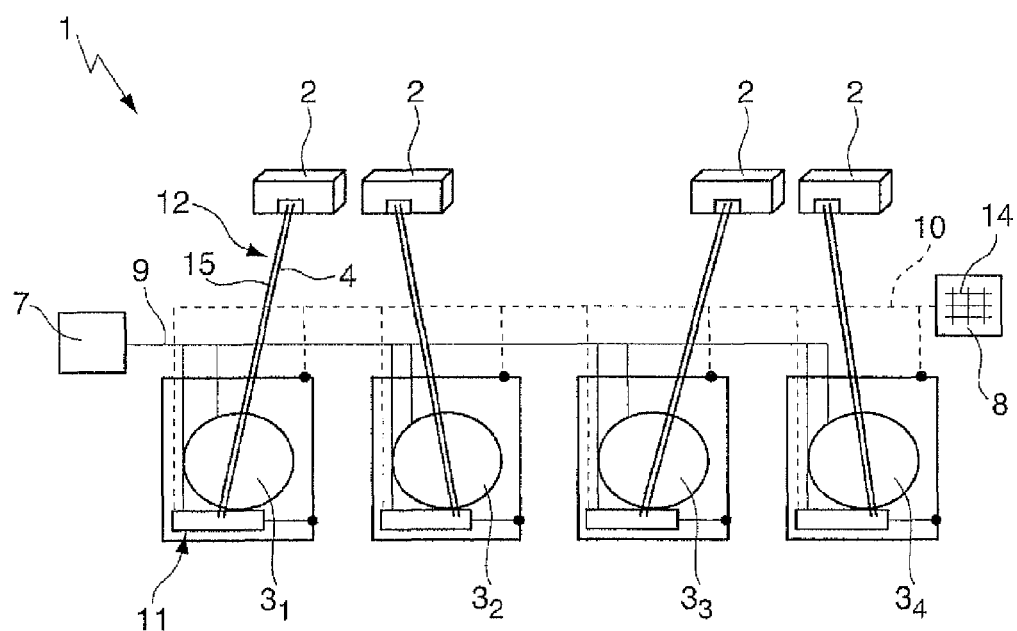
FIGS. 4 to 6 show the laser system according to the invention, with modified data lines in each case.

In FIG. 4, the data line 12 is formed by a single Ethernet line 15 via which the data exchange between the interface 11 and laser 2 is carried out, that is to say, the transmission of system control data and safety control data.

Figure 5:
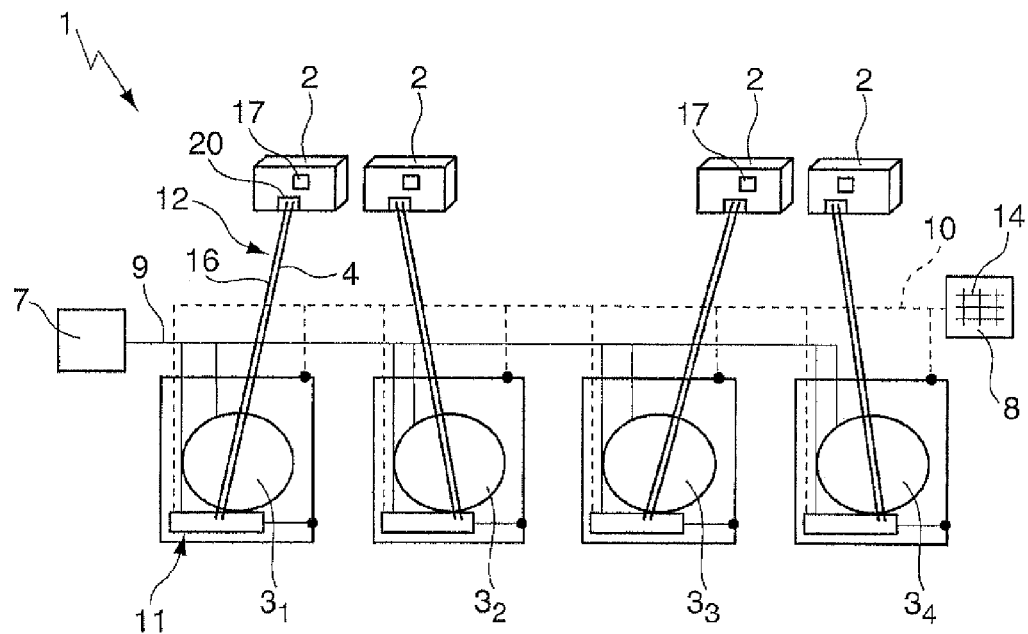

In FIG. 5, the data line 12 is formed by another light guide 16, via which the data exchange between the interface 11 and laser 2, that is to say, the transmission of system control data and safety control data, is carried out in an optical manner. To this end, corresponding electro-optical converters 17 are provided on the laser 2 and interface 11 as transmitters and receivers.

Figure 6:
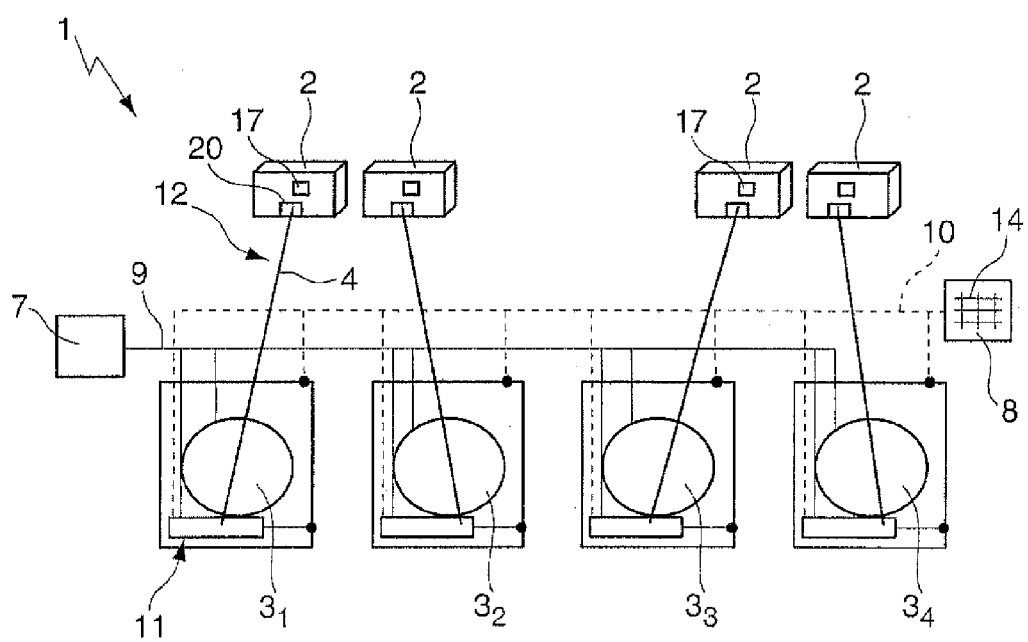

In FIG. 6, the data line 12 is formed by the light guide 4a of the laser light cable 4, via which both the laser radiation from the laser 2 to the laser processing unit 3 and the optical data exchange between the interface 11 and laser 2, that is to say, the transmission of system control data and safety control data, are carried out.

What is claimed is:

1. A laser system, comprising:
   one or more lasers;
   one or more laser processing units each connected to a respective one of the one or more lasers by a laser light cable and a data line associated uniquely with the laser light cable, each laser processing unit including a safety device for monitoring the laser processing unit and an interface for the data line; and
   a central safety control operably associated with the one or more laser processing units and configured to monitor the safety devices of multiple laser processing units of the laser system,
   wherein the interface of each of the one or more laser processing units is connected to the central safety control and via the data line to the respective one of the one or more lasers.

2. The laser system of claim 1 in the form of a laser network comprising multiple lasers and multiple laser processing units each connected to a respective one of the lasers, the central safety control connected to all of the laser processing unit interfaces.

3. The laser system of claim 1, further comprising a central system control for controlling each laser and each laser processing unit of the laser system.

4. The laser system of claim 3, wherein each laser processing unit of the laser system has a second interface connected to the central system control and via a second data line to the respective one of the one or more lasers.

5. The laser system of claim 3, wherein the interfaces of the laser processing units are connected to the central system control by a bus.

6. The laser system of claim 3, wherein the data line is formed by two electrical lines for a separate transmission of system control data of the central system control and safety control data of the central safety control.

7. The laser system of claim 3, wherein each laser processing unit of the laser system has a first interface that is connected to the central system control and via the data line to the respective one of the one or more lasers, and a second interface that is connected to the central safety control and via the data line to the respective one of the one or more lasers.

8. The laser system of claim 7, wherein at least one of the first interface or the second interface is connected to a processing optics of the laser processing unit, to which the laser light cable is connected or is provided in the vicinity thereof.

9. The laser system of claim 1, wherein the interfaces of the laser processing units are connected to the central safety control by a bus.

10. The laser system of claim 1, wherein the central safety control has a safety matrix in which an association between a particular laser processing unit and a particular laser is stored, and wherein, in an event of an open safety circuit of the particular laser processing unit, the associated particular laser is intended to be switched off by the central safety control via the interface of the particular laser processing unit.

11. The laser system of claim 1, wherein the data line is formed by a single electrical line.

12. The laser system of claim 1, wherein the data line is formed by one of a light guide of the laser light cable or by an additional light guide.

13. The laser system of claim 1, wherein the laser light cable and the data line are joined together to form one of a cable bundle or a single cable.

14. The laser system of claim 1, wherein the laser light cable transmits a pilot laser beam from a particular laser to a particular laser processing unit which the associated data line is connected to and which requests and detects the pilot laser beam.

15. The laser system of claim 1, wherein one or more interfaces of each laser processing unit of the laser system is provided in an interface module of the laser processing unit.

16. The laser system of claim 1, wherein at least one laser of the one or more lasers has a laser interface for the laser light cable and the data line.

17. The laser system of claim 1, wherein at least one laser processing unit of the one or more laser processing units includes a processing optics that has an interface connected to the central safety control and via the data line to a respective one of the one or more lasers.

18. The laser system of claim 17, wherein the processing optics has a second interface connected to a central system control and via the data line to the respective one of the one or more lasers.

19. The laser system of claim 1, wherein each laser processing unit of the laser system is controlled by at least one of a local system control or a central system control.

20. The laser system of claim 1, wherein the data line transmits values used for a safe power limitation of an individual light path with respect to a respective laser processing unit to which the data line is connected.

* * * * *